(12) United States Patent
Wentroble et al.

(10) Patent No.: US 12,536,023 B2
(45) Date of Patent: Jan. 27, 2026

(54) DUAL ROLE SUPPORT FOR A HIGH-SPEED CAPABLE USB REPEATER

(71) Applicant: Texas Instruments Incorporated, Dallas, TX (US)

(72) Inventors: Mark Edward Wentroble, Plano, TX (US); Anant Shankar Kamath, Bengaluru (IN); Rakesh Hariharan, Bengaluru (IN); Prajwala P, Bengaluru (IN); Suzanne Mary Vining, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 65 days.

(21) Appl. No.: 18/731,784

(22) Filed: Jun. 3, 2024

(65) Prior Publication Data

US 2024/0320013 A1    Sep. 26, 2024

Related U.S. Application Data

(63) Continuation of application No. 17/521,378, filed on Nov. 8, 2021, now Pat. No. 12,026,521.

(60) Provisional application No. 63/245,359, filed on Sep. 17, 2021.

(51) Int. Cl.
| | |
|---|---|
| *G06F 13/00* | (2006.01) |
| *G06F 1/3215* | (2019.01) |
| *G06F 9/4401* | (2018.01) |
| *G06F 13/38* | (2006.01) |
| *G06F 13/42* | (2006.01) |

(52) U.S. Cl.
CPC .......... *G06F 9/4411* (2013.01); *G06F 1/3215* (2013.01); *G06F 13/382* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 8,982,746 B2 | 3/2015 | Chen et al. | |
| 2009/0052559 A1 | 2/2009 | Iwasaki | |
| 2011/0304847 A1* | 12/2011 | Mahowald | ............... H03F 3/08 |
| | | | 250/214 AL |
| 2014/0149609 A1* | 5/2014 | Chan | .................... G06F 13/385 |
| | | | 710/16 |
| 2017/0019105 A1* | 1/2017 | Xiao | ....................... G06F 13/00 |

(Continued)

*Primary Examiner* — Henry Tsai
*Assistant Examiner* — Dean Phan
(74) *Attorney, Agent, or Firm* — Xianghui Huang; Frank D. Cimino

(57) ABSTRACT

A serial bus repeater includes first and second ports adapted to be coupled to respective devices. A first termination resistor network couples to the first port. A second termination resistor network couples to the second port. A squelch detect circuit couples to the first bus port and is configured to detect activity on the first bus and to generate a squelch signal responsive to detection of activity on the first port. A first state machine is configured to: determine an elapsed time during which the squelch signal indicates activity on the first port; determine that the elapsed time exceeds a first threshold; and, responsive to the determination that the elapsed time exceeds the first threshold, assert configuration signals to reconfigure the first and second termination resistor networks.

20 Claims, 9 Drawing Sheets

(56) References Cited

U.S. PATENT DOCUMENTS

| | | |
|---|---|---|
| 2017/0277249 A1 | 9/2017 | Low et al. |
| 2020/0119424 A1 | 4/2020 | Lim et al. |
| 2020/0125517 A1 | 4/2020 | Maung et al. |
| 2020/0125527 A1 | 4/2020 | Maung et al. |

* cited by examiner

DUAL ROLE SUPPORT FOR A HIGH-SPEED CAPABLE USB REPEATER

CROSS-REFERENCE TO RELATED APPLICATIONS

This application is a continuation of U.S. application Ser. No. 17/521,378 filed Nov. 8, 2021, which claims priority to U.S. Provisional Application No. 63/245,359, filed Sep. 17, 2021, all of which are hereby incorporated herein by reference in their entireties.

BACKGROUND

Serial buses, such as the Universal Serial Bus (USB), are widely used to interconnect devices. Over a USB link, a host device communicates with a peripheral device. Typically, the host device initiates communications with the peripheral device. More recent versions of the USB standard permit for role reversal in which the host becomes the peripheral, and the peripheral becomes the host. That is, in some implementations, a device can take on the role of host or peripheral.

SUMMARY

In one example, a serial bus repeater includes first and second ports adapted to be coupled to respective devices. A first termination resistor network couples to the first port. A second termination resistor network couples to the second port. A squelch detect circuit couples to the first bus port and is configured to detect activity on the first bus and to generate a squelch signal responsive to detection of activity on the first port. A first state machine is configured to: determine an elapsed time during which the squelch signal indicates activity on the first port; determine that the elapsed time exceeds a first threshold; and, responsive to the determination that the elapsed time exceeds the first threshold, assert configuration signals to reconfigure the first and second termination resistor networks.

In another example, a method is described for implementing role reversal in a serial bus repeater, in which the serial bus repeater has a first port and a second port. The example method includes detecting, by a first state machine, an idle state on the first port for more than a first threshold period of time. Further, responsive to the detection of the idle state on the first port for more than the first threshold period of time, the method includes determining that termination resistors consistent with a higher speed state are not coupled to the first port and determining that a voltage on the first port is greater than a second threshold; and. Further still, responsive to determining (a) that the termination resistors consistent with the higher speed state are not coupled to the first port and, (b) that the voltage on the first port is greater than the second threshold, the method also includes reconfiguring first termination resistors on the first port and second termination resistors on the second port.

BRIEF DESCRIPTION OF THE DRAWINGS

For a detailed description of various examples, reference will now be made to the accompanying drawings in which.

The same reference numbers or other reference designators are used in the drawings to designate the same or similar (either by function and/or structure) features.

DETAILED DESCRIPTION

Devices can be coupled together via serial links to exchange data and/or power. The embodiments described herein pertain to devices interconnected by a USB link. However, the embodiments may be applicable to other types of serial links besides USB. Over a USB link, a host device (e.g., a computer) is coupled to a peripheral device. Data may be exchanged between the host device and the peripheral device and/or power may be supplied by the host device to the peripheral device.

Some applications benefit from including a USB repeater between the host device and the peripheral device. For example, the USB specification defines a maximum cable length that can be used to interconnect devices. Cables longer than the maximum specification may result in signal degradation that may decrease slew rates leading to an increase in bit errors. A USB repeater can be coupled between two devices to alleviate this problem. For example, a USB repeater may be coupled to a host device via one USB cable and to a peripheral device via a second USB cable. The USB repeater may include edge boosters and equalizers to boost the signal strength and increase the signal-to-noise ratio (SNR) to enable the host and peripheral devices to be coupled together over a longer distance than would otherwise have been the case if the host and peripheral devices were connected together by a single USB cable. In another application, the host device may implement the embedded USB (e-USB) protocol, and a repeater is included within the USB device itself to convert e-USB to standard USB.

Figure 5A:
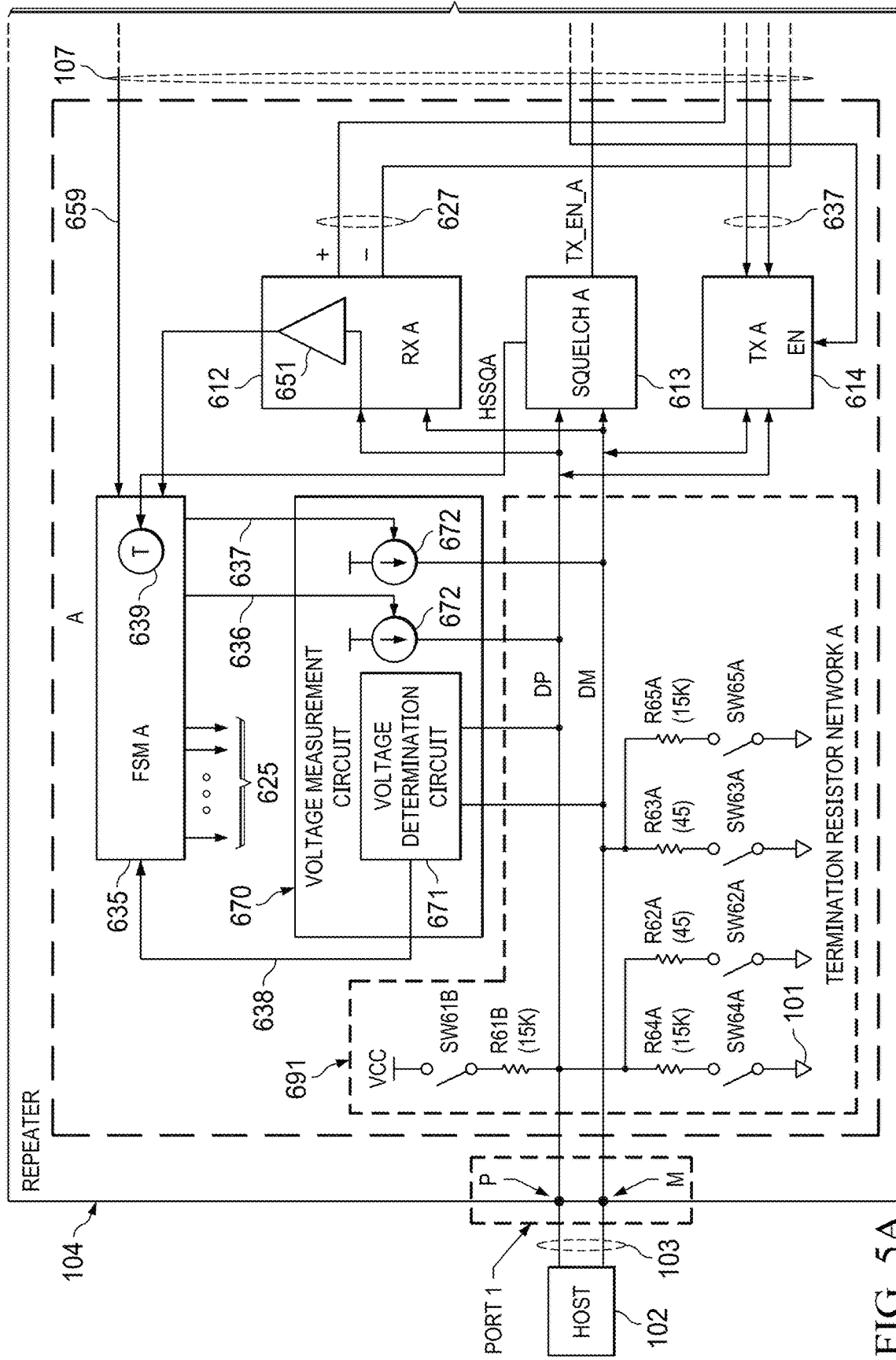
FIGS. 5A and 5B is a block diagram of the serial bus repeater in accordance with an example.
Figure 5B:
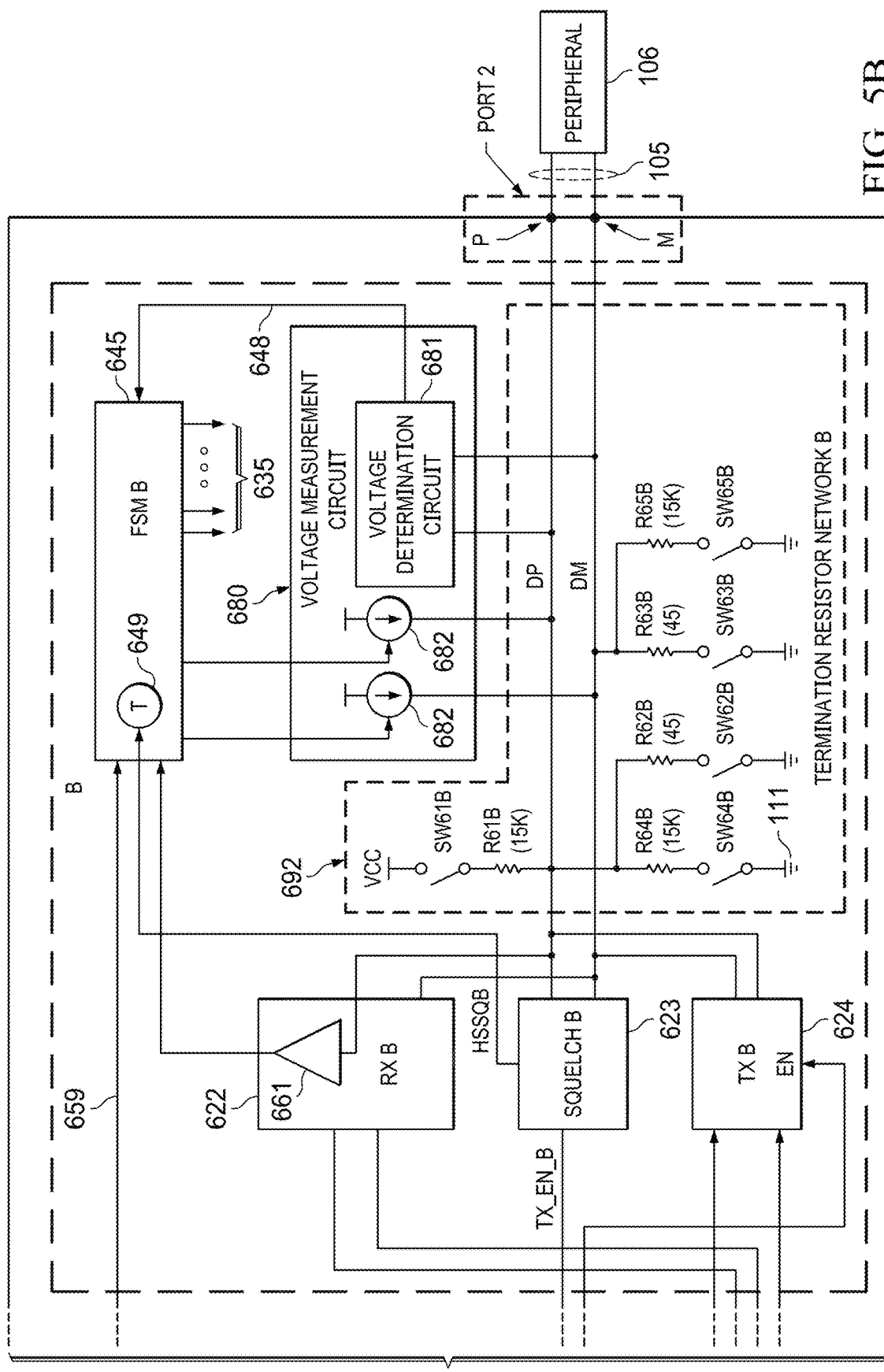

A USB repeater includes two electrical interfaces-one electrical interface connected to the host device and another electrical interface connected to the peripheral device. The electrical interfaces are such that, to the host device, the repeater operates as a peripheral device and, to the peripheral device, the repeater operates as a host device. An example implementation of a USB repeater is shown in FIGS. 5A and 5B and described below.

The USB link power management (LPM) specification defines four power management states that may be implemented by a USB-compliant device. The four power management states include L0 (On), L1 (Sleep), L2 (Suspend), and L3 (Off). In the L0 state, the host and peripheral devices can operate at Low Speed (LS), Full Speed (FS), or High Speed (HS) modes. The data rate for the LS mode is 1.5 mega-bits per second (Mbps). The data rate for FS mode is 12 Mbps, and the data rate for the HS mode is 480 Mbps. The LPM specification added the L1 state to the USB specification, while the conditions corresponding to the L0, L2, and L3 states antedate the LPM specification. The L1 state is entered using multiple packets transferred between the host and the peripheral device.

Each USB-compliant device includes termination resistors on its bus terminals. The configuration for the termination resistors depends on whether the device is in the L0 (ON) mode or in a lower power mode (e.g., L1 or L2). The termination resistor configuration also depends on whether a device in the L0 mode is operating in LS, FS, or HS. A USB repeater must also configure its termination resistors to mimic a host to the peripheral device and to mimic a peripheral to a host device.

As noted above, USB devices can swap their roles ("role reversal") in which a first device currently operating as a host ceases operating as the host and, instead operates as the peripheral device, and a second device currently operating as a peripheral ceases operating as the peripheral and, instead operates as the host device. The USB repeater described herein detects a role reversal and reconfigures its termination resistors accordingly. As used herein, "USB repeater" may mean a repeater or retimer that connects between USB devices and/or e-USB devices. In addition, "USB link" may mean a connection between devices that comply with any version of the USB standard (including e-USB devices).

Figure 1:
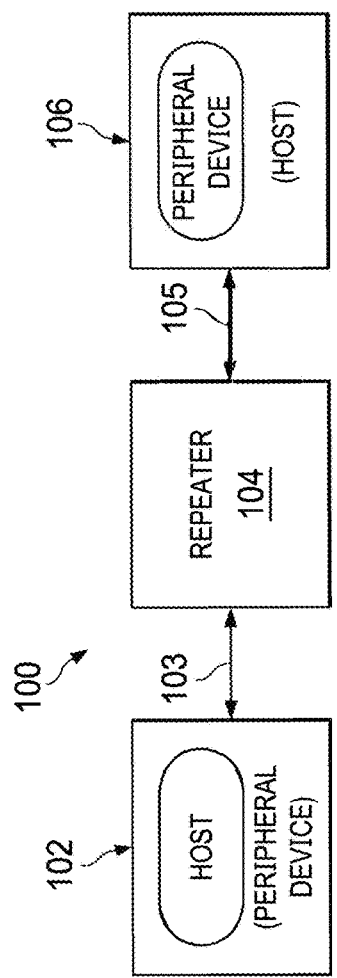
FIG. 1 is a block diagram that illustrates a system in which a first device communicates with a second device through a serial bus repeater that can detect a role reversal between the first and second devices in accordance with an example.

FIG. 1 shows a block diagram for an example serial bus system 100 that includes a serial bus repeater 104 (e.g., a USB repeater) coupled between a first device 102 and a second device 106. The link 103 between the device 102 and the serial bus repeater 104 is a serial bus (e.g. a USB link). Similarly, the link 105 between the serial bus repeater 104 and device 106 also is a serial bus (e.g. a USB link). Devices 102 and 106 communicate with each other via the serial bus repeater 104. Each device 102 and 106 can function as either a host or a peripheral. In the particular configuration of FIG. 1, device 102 is currently functioning as the host (as indicated by the word "host" being circled and "peripheral device" being in parentheses), and device 106 is currently functioning as the peripheral device. As the host, device 102 initiates communications with device 106. The role of "host" and "peripheral device" can be reversed. That is, instead of device 102 being the host and device 106 being the peripheral, device 106 can become the host and device 102 can become the peripheral.

In one example, the serial bus system 100 is a USB 2.0 system in which the device functioning as the host is a USB 2.0 host, the device functioning as the peripheral is a USB 2.0 device, and the serial bus repeater 104 is a USB 2.0 repeater. In some implementations of the serial bus system 100, the serial bus repeater 104 provides electrical isolation between devices 102 and 106. In other implementations of the serial bus system 100, the serial bus repeater 104 does not electrically isolate devices 102 and 106. The serial bus repeater 104 receives, conditions, and retransmits signals received from the host device or the peripheral device. Some implementations of the serial bus repeater 104 do not decode the data packets received from devices 102 or 106.

Figure 2:
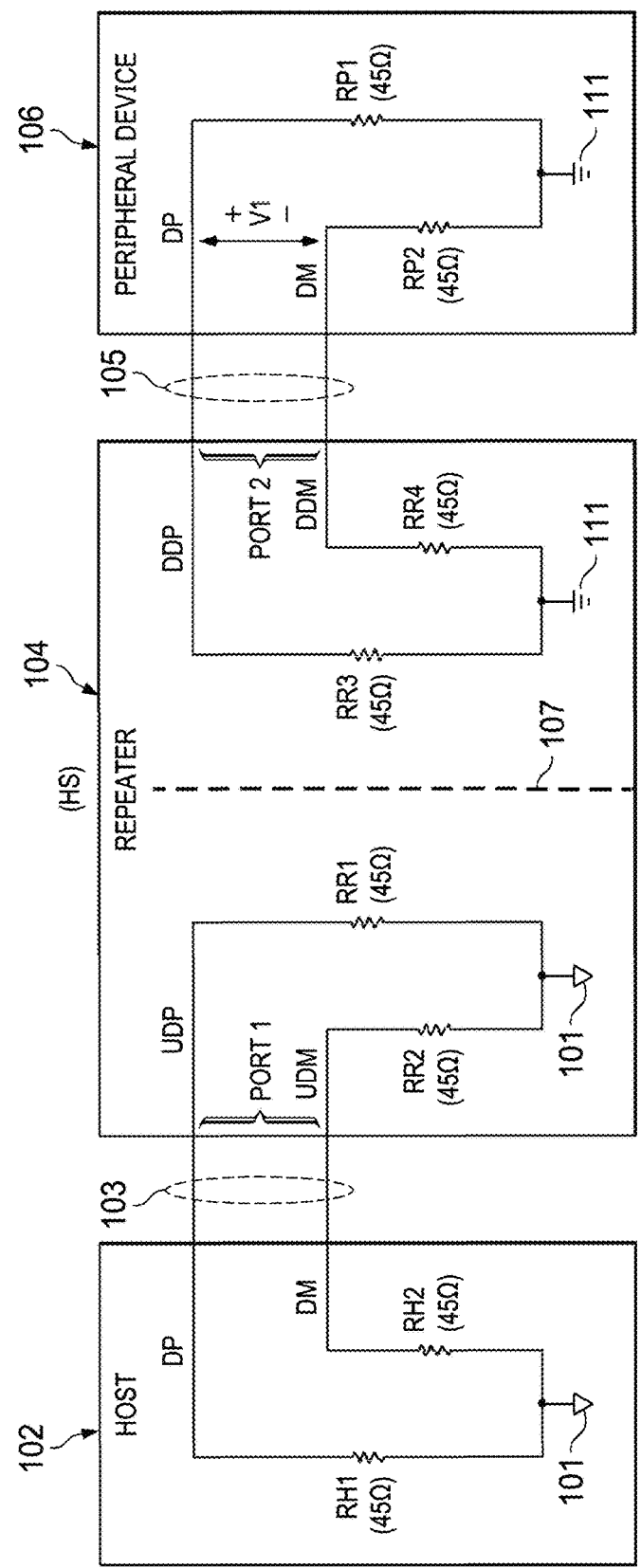
FIG. 2 is a schematic diagram that illustrates the termination resistor configuration for USB devices operating in the high speed (HS) mode while in the ON L0 state in accordance with an example.

As noted above, the configuration of the termination resistors on the ports of the serial bus repeater depends on the operative speed mode (HS, FS, LS) of the devices as well as the power state in which the devices operate. FIG. 2 shows an example of device 102 operating as the host, device 106 operating as the peripheral device, with the devices operating in the L0 (ON) power state and operating in the HS mode. The USB links 103 and 105 in this example are differential links, each link comprising a data plus (DP) signal line and a data minus (DM) signal line. The port on the host side of the repeater is referred to as the "upstream" port (Port 1 is the upstream port in FIG. 1), and the port on the peripheral side is referred to as the downstream port (Port 2). The DP and DM signal lines within the repeater on the upstream port are referred to as UDP and UDM, and the DP and DM signal lines within the repeater on the downstream port are referred to as DDP and DDM.

In the HS L0 state, the termination resistors for both the host and peripheral devices 102 and 106 include pull-down resistors. FIG. 2 shows the device 102 (host) having pull-down resistors RH1 and RH2, and device 106 (peripheral device) having pull-down resistors RP1 and RP2. In the HS L0 state, all four pull-down resistors are in the range of 40-50 ohms (e.g., 45 ohms as indicated in parentheses in FIG. 1). The serial bus repeater 104 mimics the host to the peripheral, and vice versa, and thus also implements pull-down resistors RH1, RH2, RH3, and RH4 (e.g., 45 ohms).

Dashed line 107 indicates an isolation barrier (e.g. a galvanic isolation barrier—that may allow for one side of repeater 104 to operate at one voltage level while the other side operates at a different voltage level) within the serial bus repeater 104. As such, the ground 101 on the side of the repeater including Port 1 may be a different ground than ground 111 on the side of the repeater including Port 2.

Figure 3:
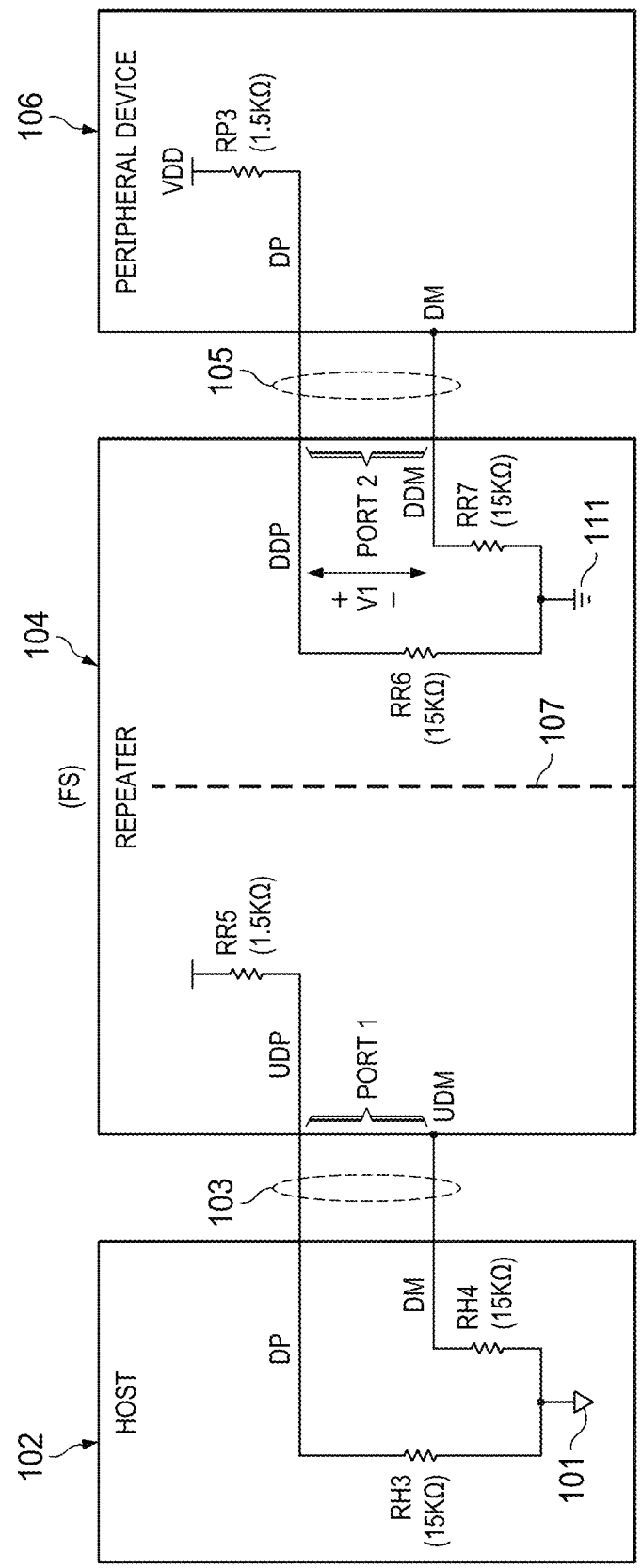
FIG. 3 is a schematic diagram that illustrates the termination resistor configuration for USB devices in the full speed (HS) mode in accordance with an example.

FIG. 3 shows the termination resistor configuration for the FS mode. In the FS mode, the host device 102 incudes pull-down resistors RH3 and RH4. Pull-down resistors RH3 and RH4 are in the range of 14.25 kilo-ohms (kohms or kΩ) to 15.75 kohms (e.g., 15 kohms as indicated in parentheses). In the FS mode, the peripheral device 106 implements a pull-up termination resistor RP3 on the DP signal line and disconnects the DM signal line (no pull-up or pull-down resistor). Pull-up resistor RP3 for the FS mode on the peripheral device includes a resistance in the range of 900 ohms to 1.575 kohms (e.g., 1.5 kohms). For the LS mode, the termination resistor configuration is similar to that shown in FIG. 3, but the 1.5 kohm pull-up resistor RP3 is connected to the DM signal line, not the DP signal line.

A role reversal can occur with or without a disconnect event. For a disconnect event, the peripheral device is disconnected from the repeater 104. Disconnecting the peripheral device 106 may include physically disconnecting the peripheral device (e.g., disconnecting a cable) from the repeater 104 or powering off the peripheral device. In one scenario, the devices 102 and 106 can swap their respective roles of host and peripheral without a disconnect event. In another scenario, the roles of host and peripheral are reversed following a disconnect event.

The serial bus repeater 104 described herein is capable of detecting a role reversal with or without a disconnect event. Further, the serial bus repeater 104 generally has a symmetrical architecture in which each port (Port 1, Port 2) can be connected to a device that operates as host device or as a peripheral device.

Figure 4A:
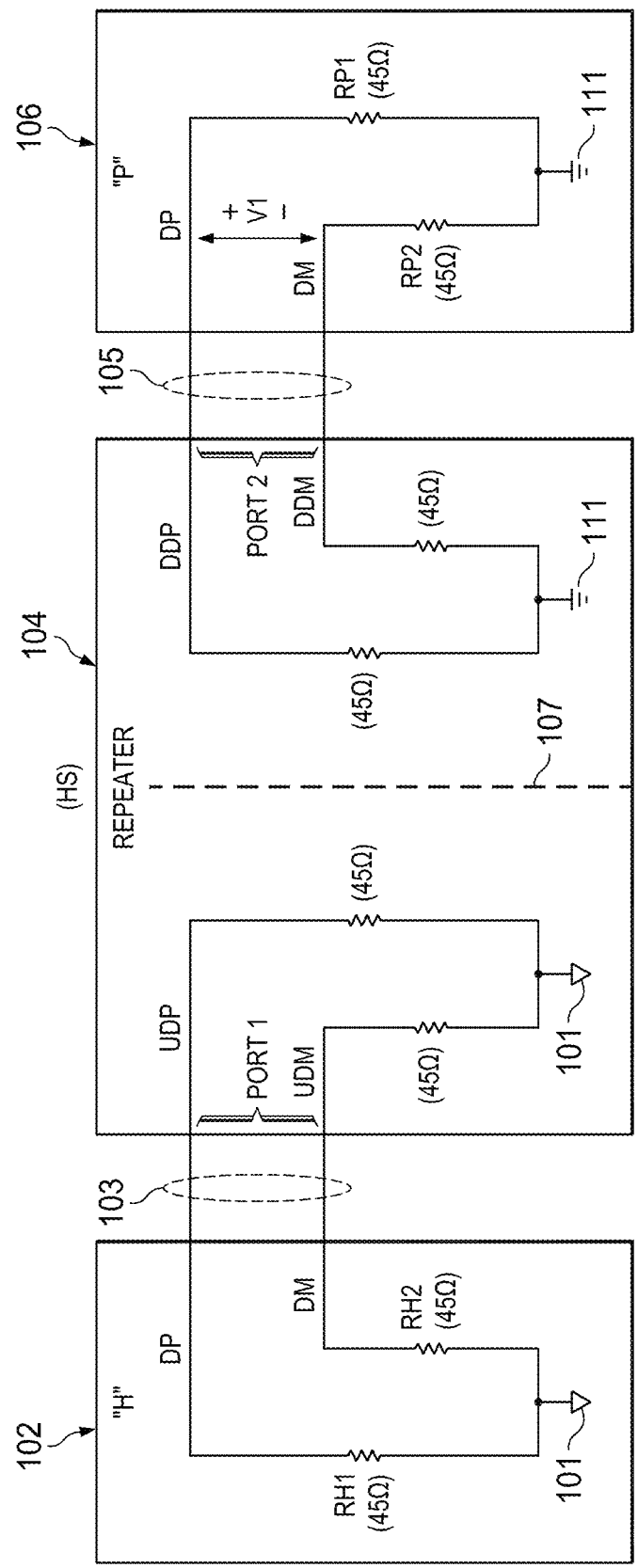
FIGS. 4A, 4B and 4C are schematic diagrams that illustrate a sequence of configurations for devices changing from the HS mode to the FS mode and the corresponding response of the serial bus repeater in accordance with an example.
Figure 4B:
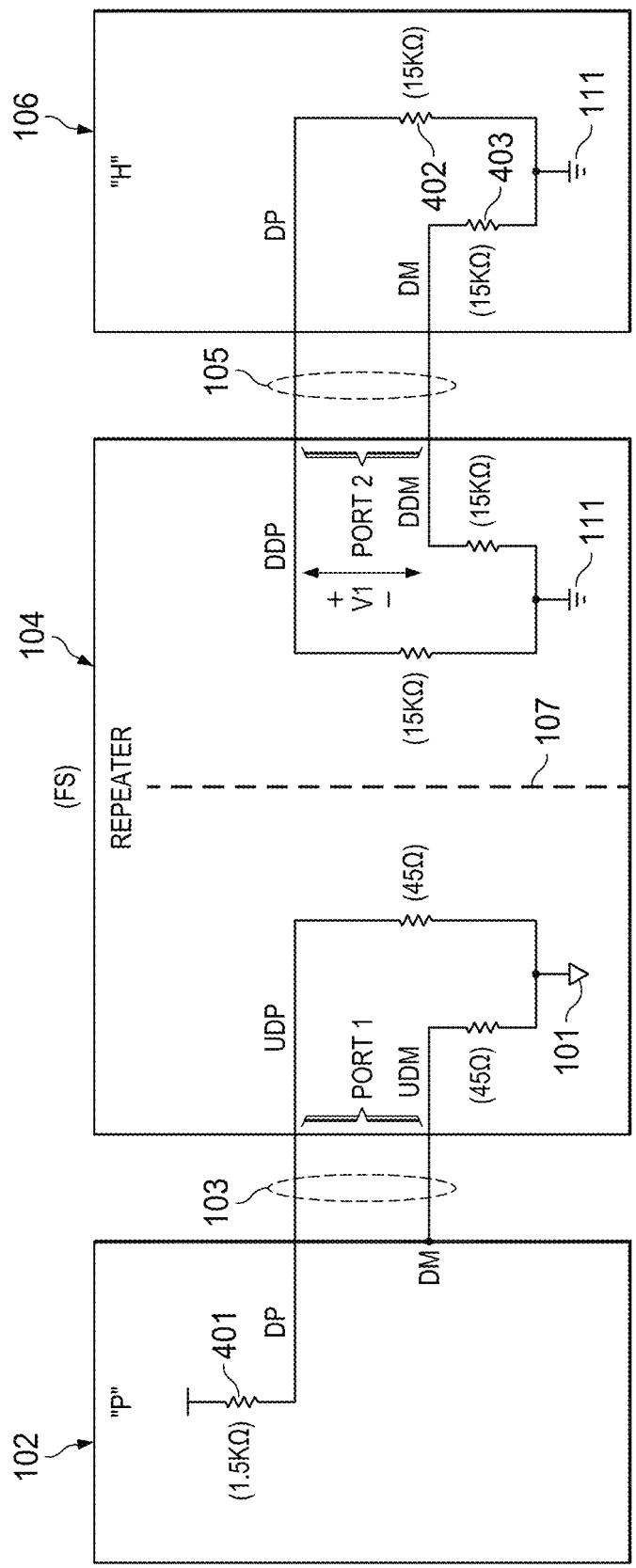
Figure 4C:
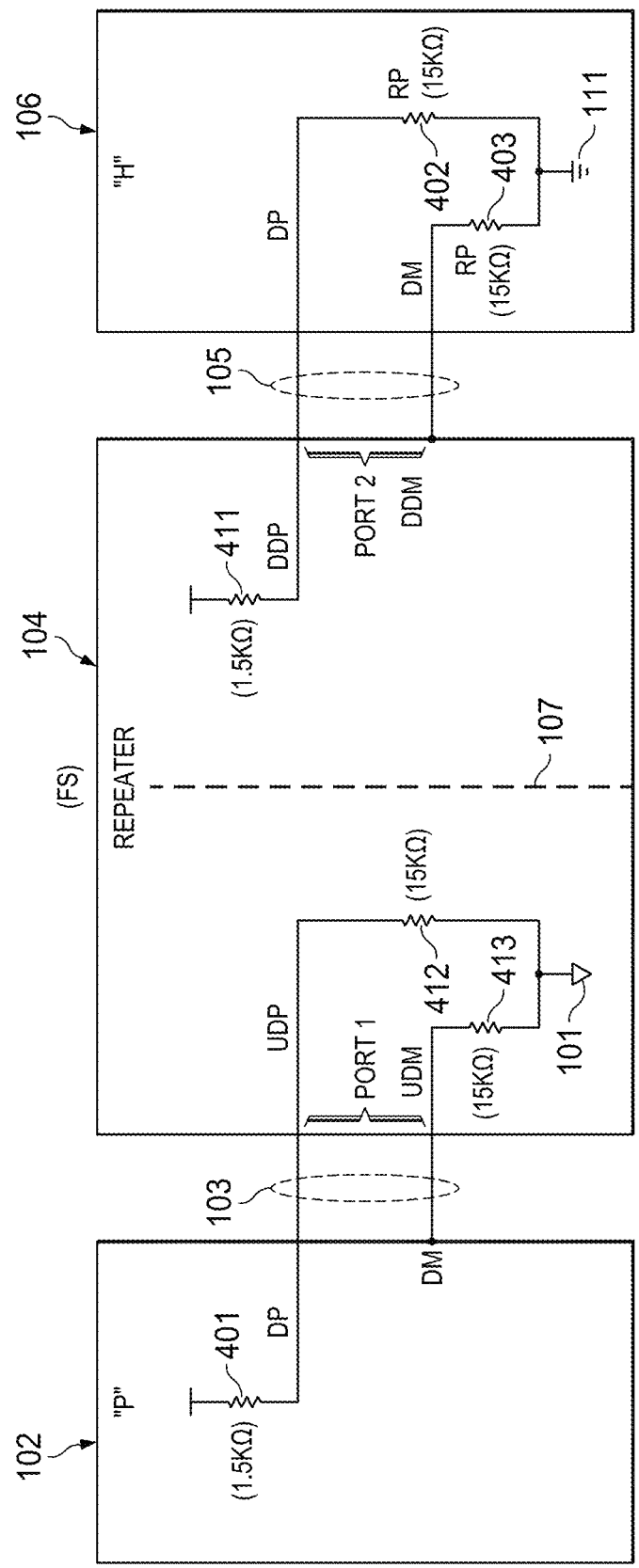

FIGS. 4A-4C illustrate the sequence of events regarding the termination resistor configurations for a role reversal without a disconnect event. In FIG. 4A, device 102 functions as the host ("H") and device 106 functions as the peripheral ("P") in the HS L0 state. The host device 102, the peripheral device 106, and the serial bus repeater 104 implement 45-ohm pull-down resistors as described above with regard to FIG. 2.

In FIG. 4B, the roles of host and peripheral have been reversed. Further, during a role reversal, the devices enter the FS mode instead of remaining in the HS mode. Device 102 is now the peripheral device, and device 106 is the host device. Since the peripheral device 102 is in the FS mode, the device 102 implements a 1.5 kohm resistor 401 on the DP signal line, and as the host, device 106 implements 15 kohm pull-down resistors for each of the resistors 402 and 403. As is explained below, a state machine (or other logic circuitry, such as a processor, application specific integrated circuitry, digital circuitry and/or analog circuitry) within the serial bus repeater detects the role reversal and reconfigures the termination resistors within the repeater to the configuration shown in FIG. 4C. The termination resistors coupled to Port 1 are 15 kohm pull-down resistors 412 and 413 mimicking a host to the newly appointed peripheral device 102. Port 2 is configured to have a 1.5 kohm pull-up resistor 411 on the DP signal line thereby mimicking a peripheral to the host device 106.

FIGS. 5A and 5B are block diagrams illustrating one possible implementation of the serial bus repeater 104. The serial bus repeater includes an "A" portion and a "B" portion, where the "A" portion is isolated from the "B" portion by isolation 107 such that the "A" portion may operate at a different voltage (e.g. the supply voltage and ground) than the "B" portion. The A portion includes a Port1 that has Plus (P) and Minus (M) terminals (with respective DP and DM signal lines). Similarly, the B portion includes Port2 that has P and M terminals (with respective DP and DM signal lines). The A portion includes a receiver (RX) A 612, a squelch A circuit 613, a transmitter A 614 (the letter "A" indicates that these are components of the A portion of the repeater), and a finite state machine (FSM) 635. Similarly, the B portion includes a receiver B 622, a squelch B circuit 623, a transmitter B 624, and an FSM 645. The serial bus repeater 104 thus has a symmetrical architecture that permits either pair of its P/M data terminals to be connected via a cable to device(s) that functions as either a host device or a peripheral device. The A portion can be connected to a host and the B portion can be connected to a peripheral device, or the B portion can be connected to a host and the A portion can be connected to a peripheral device. The roles of the devices can be reversed, and the repeater 104 detects the role reversal and configures its termination resistors accordingly. The isolation 107 described above is shown in dashed outline. Transmitters 614 and 624 and receivers 612 and 622 facilitate communications (such as data communications) through isolation 107.

Each portion A and B has a termination resistor network. Portion A has a termination resistor network A 691. Portion B has a termination resistor network B 692. The termination resistor network A 691 includes resistors R61A, R62A, R63A, R64A and R65A (illustrative resistances listed in parentheses). Each resistor is coupled to a switch SW61A, SW62A, SW63A, SW64A or SW65A. Switch SW61A and resistor R61A are coupled in series between the A portion's supply voltage VDD and the P terminal. With switch SW61A closed (on), resistor R61A electrically is a pull-up resistor on the P line. Resistor R64A and switch SW64A are coupled in series between the P line and ground 101 and thus is configurable as a pull-down resistor when switch SW64A is closed. Resistor R62A and switch SW62A are coupled in series between the P terminal and ground 101. Resistor R63A and switch SW63A are coupled in series between the M terminal and ground 101. Similarly, resistor R65A and switch SW65A are coupled in series between the M terminal and ground 101.

The termination resistor network B 692 of the repeater 104 includes a similar set of termination resistors and switches (compared to termination resistor network A 691) with illustrative resistances listed in parentheses. Switch SW61B and resistor R61B are coupled in series between supply voltage VCC (which is isolated from VDD) and the B portion's P terminal. Resistor R64B and switch SW64B are coupled in series between the P terminal of the B portion and ground 111. Resistor R62B and switch SW62B are coupled in series between the P terminal of the B portion and ground 111. Resistor R63B and switch SW63B are coupled in series between the M terminal of the B portion and ground 111. Similarly, resistor R65B and switch SW65B are coupled in series between the M terminal and ground 111.

The FSMs control the configuration of the respective termination resistor networks A and B. Within the A portion, the on and off states of switches SW61A-SW65A within the termination resistor network A are controlled by the FSM A 635. Within the B portion, the on and off states of switches SW61B-SW65B within the termination resistor network B are controlled by the FSM B 645. As described below, each FSM is configured to: (a) detect, at power-on rest (POR) event or at reconnect following a disconnect, whether a peripheral device is connected to its respective port, or (b) detect a role reversal without a disconnect event. In response to either detected condition, the FSM configures its respective termination resistor network and sends a control signal 659 to the other FSM to trigger such FSM (the FSM that receives the control signal) to configures its own termination resistor network.

In the example of FIGS. 5A and 5B, the role of device 102 is that of the host, and the role of device 106 is that of peripheral. When the host 102 sends a packet to the peripheral device 106, the packet is received by receiver RX A 612 of the repeater. The receiver RX A 612 includes an equalizer, amplifier, and differential-to-serial converter, and outputs a differential signal 627 to the transmitter TX B 624. The receiver RXA 612 also includes a single-ended receiver 651 whose input is coupled to the respective DP signal line. The output of the single-ended receiver 651 is coupled to the FSM 635. The output of the single-ended receiver 651 is referenced to ground 101. The transmitter TX B 624 includes an amplifier and pre-emphasizer and forwards the amplified differential signal to the peripheral device 106 over link 105. Similarly, a packet from the peripheral device 106 to the host 102 is received by the receiver RX B 622, processed in much the same manner as for receiver RX A 612 and the output of receive RX B 622 is provided to transmitter TX A 614 as a differential signal 637, which is forwarded to the host 102 by the transmitter TX A 614. The receiver RXB 622 also includes a single-ended receiver 661 whose input is coupled to the respective DP signal line. The output of the single-ended receiver 661 is coupled to the FSM 645. The output of the single-ended receiver 661 is referenced to ground 111.

In one embodiment, each squelch A circuit 613 and squelch B circuit 623 includes an envelope detector that generates a squelch signal (HSSQ) on its output responsive to the magnitude of the detected envelope on its input exceeding a predetermined voltage. Each squelch circuit includes, for example, differential comparators, level shifters, and filters. The squelch A circuit 613 outputs signal HSSQA to FSM A 635, and the squelch B circuit 623 outputs signal HSSQB to FSM B 645. In one example, the HSSQA signal is asserted low (e.g. a logic "0") by the squelch A circuit 613 responsive to detection of the envelope on its input (Port1) being in excess of a threshold (e.g., 0.5 V), and otherwise is forced high (e.g. a logic "1") by the squelch A circuit 613 (when no signal is detected). Accordingly, signal HSSQA remains at logic "0" as long as the squelch A circuit 613 detects activity on its respective port, Port 1. Similarly, the HSSQB signal is asserted low (e.g. a logic "0") by the squelch B circuit 623 responsive to detection of the envelope on its input (Port2) being in excess of the threshold, and otherwise is forced high (e.g. a logic "1") by the squelch B circuit 623. HSSQB remains at logic "0" as long as squelch circuit B 623 is detecting activity on Port 2. In other embodiments, each squelch circuit generates its respective HSSQ output signal logic high ("1") while activity is actively being detected on the respective port. The HSSQA signal from the squelch A circuit 613 is provided to FSM 635, and the HSSQB signal from the squelch B circuit 623 is provided to FSM 645.

For a non-isolated repeater (e.g. a repeater/retimer that does not include isolation 107, each squelch circuit also generates a transmit enable signal to enable the opposite portion's transmitter upon detection of an input signal (e.g., the envelope of the input signal being in excess of the threshold). The squelch A circuit 613 generates a signal TX_EN_A which is coupled to the transmitter TX B 624. The squelch B circuit 623 generates a signal TX_EN_B which is coupled to the transmitter TX A 614. For an isolated repeater (having the isolation barrier 107), each squelch circuit is configured to enable its own transmitter to transfer the HS data across the isolation barrier 107.

Referring still to FIGS. 5A and 5B, the A and B sides of the serial bus repeater 104 also include respective voltage measurement circuits 670 and 680. Voltage measurement circuit 670 is configured to measure the voltage on the DP and DM signal lines to determine whether or not HS 45-ohm pull-down resistors are present on the A-side bus. Similarly, circuit 680 is configured to measure the voltage on the DP and DM signal lines to determine whether or not HS 45-ohm pull-down resistors are present on the B-side bus. Voltage measurement circuit 670 includes current sources 672 and a voltage determination circuit 671 (e.g., a buffer, amplifier, etc.). The FSM 635 can assert signals 636 and 637 to the respective current sources 672 to cause the current sources to turn on to provide a fixed current to the respective DP and DM signal lines. Depending on what termination resistance is connected to each DP and DM signal line, a particular voltage will be generated on the DP and DM signal lines. The voltage determination circuit 671 measures the voltage on the DP, DM signal lines and provides a signal 638 to the FSM 635 indicative of the voltage on either or both of the DP or DM signal lines. In one embodiment, two separate signals 638 are provided to the FSM 635—each signal 638 corresponding to the voltage on a respective one of the DP, DM signal lines.

Figure 6:
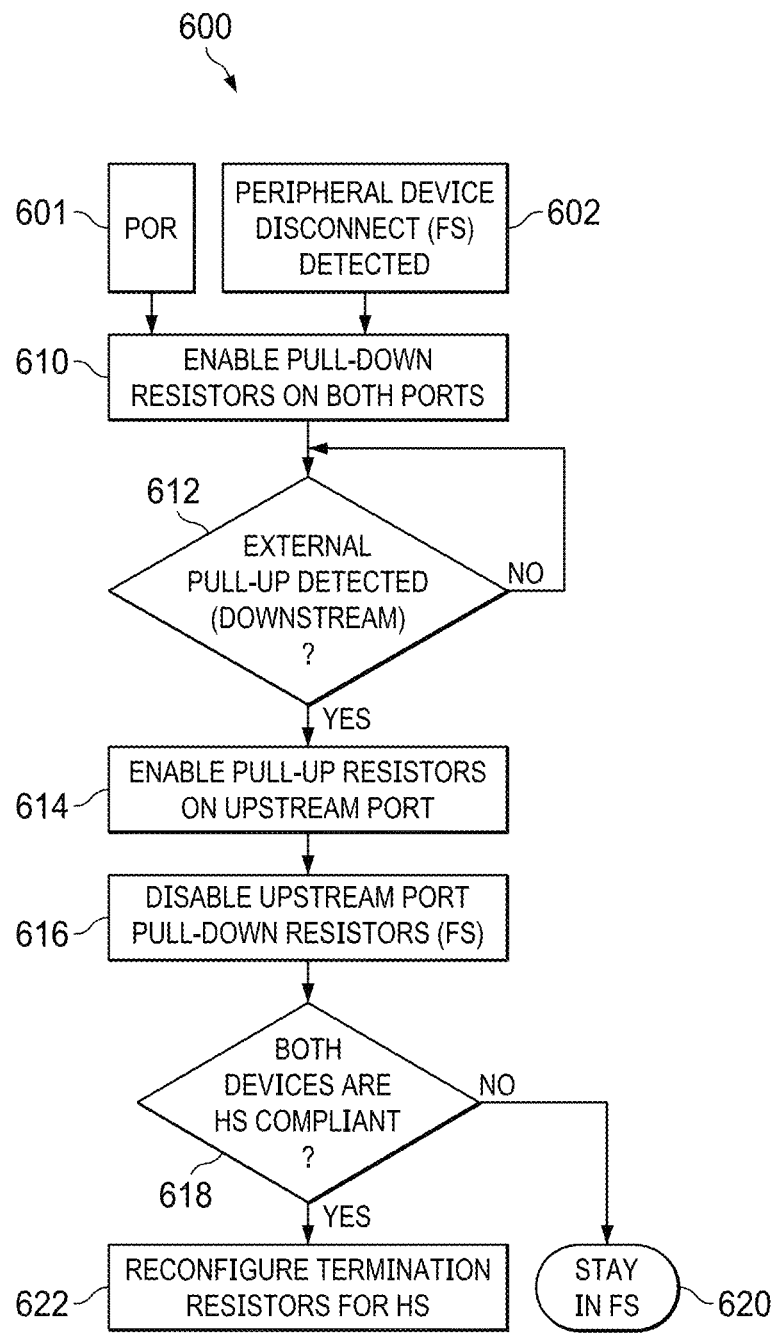
FIG. 6 is a flowchart of an illustrative method for how the serial bus repeater operates during a power-on reset event or a peripheral device disconnect event.
Figure 7:
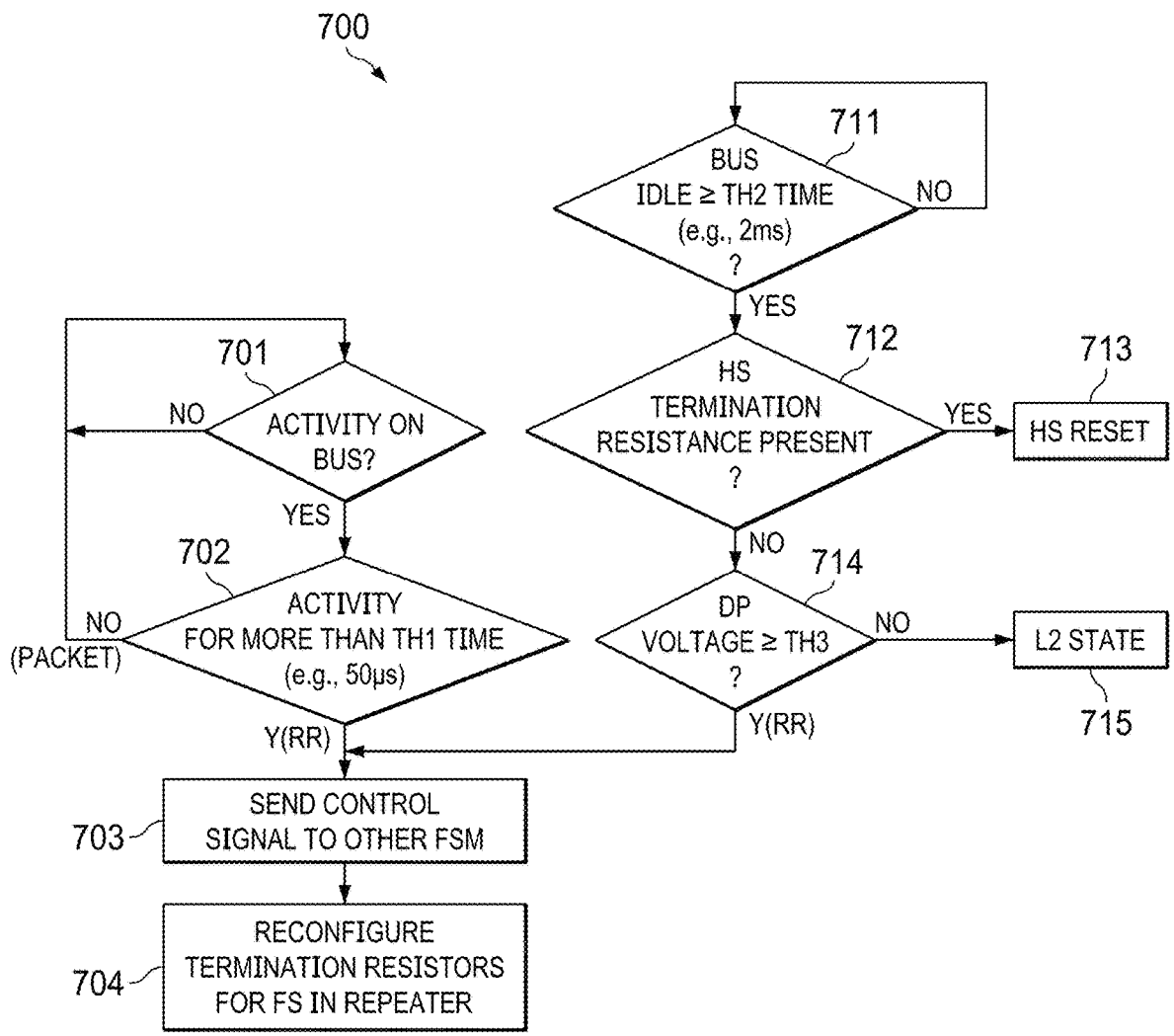
FIG. 7 is a flowchart of an illustrative method for how the serial bus repeater operates during a role reversal without a disconnect event.

FIGS. 6 and 7 are flowcharts depicting illustrative methods for how the serial bus repeater determines how to configure its termination resistor networks 691 and 692. Each flowchart will now be described in relation to the embodiment of the serial bus repeater 104 of FIGS. 5A and 5B.

Referring now to the flowchart in FIG. 6, a method 600 illustrates how the serial bus repeater responds to a POR event 601 or a peripheral device disconnect event 602 while in the FS mode or the LS mode. The FSM 635 on the "A" side of the serial bus repeater to which the peripheral device is connected will detect the POR and/or peripheral device disconnect events. Because the architecture of the serial bus repeater is symmetrical and a peripheral device can be connected to either Port 1 or Port 2, each of the FSMs 635 and 645 are configured to perform the logic depicted in FIG. 6 (and FIG. 7).

A POR event 601 may include a peripheral device powering on. In such event, an internal POR circuit detects its supply voltage rising above a valid voltage level and releases a reset signal to permit the peripheral device's circuits to be forced into an initialization sequence leading to the peripheral device configuring the termination resistors as a 1.5 Kohm on the DP signal line (FS mode of FIG. 3). A peripheral device disconnect event 602 may include the peripheral device being disconnected from a cable, the cable from the peripheral device being disconnected from the serial bus repeater, and the like. If the peripheral device was in the HS mode (with 45-ohm pull-down resistors), the repeater's state machines will detect a disconnect event, for example, during a periodic Start Of Frame (SOF) packet from the host (in which the peripheral has disconnected) and thus will change to the FS mode, and impose a 1.5 Kohm pull-up resistor on the DP signal line. Accordingly, the voltage on the DP or DM signal line is pulled up to high logic level, which is detected by the voltage determination circuit 671 or 681 on the side of the repeater from which the peripheral device is disconnected. If the peripheral device is disconnected from the bus, the respective voltage determination circuit will detect that the high logic level has ceased in favor of a low logic level. The voltage determination circuit asserts the signal 638 or 648 to the respective FSM 635, 645 thereby indicating to the FSM that a disconnect event has occurred. In either case (POR or disconnect), the peripheral device will revert to FS mode and the 1.5K pullup resistor will no longer pull the bus line up to the supply voltage, as its supply voltage is off. To the downstream side of the repeater, this will look the same as a disconnect.

Regardless of whether a POR event 601 or a peripheral device disconnect event 602 has occurred, the FSM that detected the POR event or the disconnect event informs, at step 610, the other FSM (via control signal 659) of the POR or disconnect event, and both FSMs respond by asserting their respective control signals 625 or 635 to cause the 15 kohm resistors R64A, R65A, R64B, and R65B to be connected to the respective DP and DM signal lines. In this configuration, the repeater 104 will have 15 kohm pull-down resistors on both signal lines of both ports Port 1 and Port 2.

Control then loops at decision 612, until an external pull-up resistor is detected on one of the ports. The port for which a pull-up resistor is detected is designated the "downstream" port (connected to a peripheral device). The other port is the "upstream" port (connected to a host device). When a peripheral device powers up or is reconnected to the serial bus repeater 104, the peripheral device will have a 1.5 kohm pull-up resistor on its DP signal line (for FS mode) or its DM signal line (for LS mode). In either case, the voltage on the respective signal line will be forced high by the external pull-up resistor and that change in voltage will be detected by the respective voltage determination circuit 671, 681. The voltage determination circuit that detects the increase in voltage due to the external pull-up resistor informs its respective FSM of this condition via signal 638 or 648.

At 614, the FSM that has been informed of the increase in DP bus voltage on its respective port by the respective voltage determination circuit then asserts control signal 659 to the opposite FSM to cause that FSM to enable the pull-up resistor on its port thereby mimicking that port as a peripheral device. For example, if FSM B 645 detects a pull-up resistor on its port, Port 2, FSM B 645 asserts signal 659 to FSM A 635 to cause FSM A 635 to close switch SW61A. The reciprocal response occurs if an external pull-up is connected to the DP signal line on the A side of the repeater.

At 616, the FSM on the side of the repeater that is now mimicking a peripheral device (FSM A 635 in the example above) to a host device then disables the pull-down resistors on its port. At this point, the configuration of the termination resistor networks mimics a peripheral device (pull-up resistor on DP, disconnected DM) on the upstream port (i.e., the port connected to the host) and mimics a host device (15 kohm pull-down resistors) on the downstream port (i.e., the port connected to the peripheral device) in the FS mode.

The host and peripheral devices can remain in the FS mode or, if both are HS-compliant, the devices can engage in a handshake protocol to transition to the HS mode. Thus, at 618 if either or both devices are not HS-compliant (or the devices do not negotiate to determine if they are both HS-compliant), the method ends at 620, and the devices remain in the FS mode. However, if the devices enter the HS mode, their respective termination will include 45-ohm pull-down resistors on both the DP and DM signal lines (see HS example of FIG. 2). The serial bus repeater 104 detects the external pull-down resistors on the DP and DM signal lines on both ports, and responds by configuring its own termination resistor networks to implement the 45-ohm pull-down resistors on the DP and DM signal lines.

FIG. 7 is a flowchart depicting a method 700 for detecting a role reversal between the host and peripheral devices without a disconnect event before the role reversal. FIG. 2 shows the termination resistor configuration for the HS mode (all devices and ports have 45-ohm pull-down resistors). For the HS host and peripheral devices to swap roles, the devices first change from the HS mode down to the FS mode. As illustrated in FIG. 3, in the FS mode, the host has 15-kohm pull-down resistors on both signal lines, and the peripheral device has a 1.5-kohm pull-up resistor on the DP signal line. Thus, if a host (in HS mode) changes roles to a peripheral (which will initially be in the FS mode), the voltage on the new peripheral device's DP signal line will change from logic low (due to the former 45 ohm pull-down resistor) to logic high (due to the newly switched 1.5 kohm pull-up resistor).

This increase in DP bus voltage may be detected (at 701) by the squelch circuit on the side of the repeater which is connected to the device that has now taken on the role of peripheral device. The squelch circuit asserts its respective HSSQA or HSSQB output signal in response to the increase in DP bus voltage. However, it needs to be determined whether the squelch circuit has detected a change in external resistance corresponding to a role reversal, or whether the change in bus voltage is simply data being transmitted between host and peripheral through the repeater.

As shown in FIGS. 5A and 5B, FSM A 635 includes a timer 639 and FSM B 645 includes a timer 649. The FSM that receives the asserted HSSQ signal from the respective squelch circuit responds to the asserted HSSQ signal by enabling its timer. Per the USB standard, a packet on the bus for the HS mode should not last more than a certain period of time (e.g., 17.2 microseconds). The timer 639, 649 enables the respective FSM (at 702) to determine whether the squelch circuit's HSSQ signal is asserted for a period of time that is longer than a maximum length of time for packets passing through the serial bus repeater between the first and second ports. In one example, the FSM uses the timer to determine whether the HSSQ signal is asserted for more than 35 microseconds, in the event that a host packet and a response packet from the peripheral device occur so closely together that the digital logic does not distinguish between the two packets (both packets collectively appear to be one continuous packet). In a particular application, the threshold time period implemented by the FSM (TH1 in decision 702) is 40 microseconds, and 50 microseconds in another application. If the HSSQ signal is asserted for 40 or 50 microseconds (or any time threshold longer than the period of time a HS packet should last on the bus), then the FSM determines that an external pull-up resistor is present and thus a role reversal is occurring.

If the HSSQ signal is not asserted for more than the threshold period of time (TH1 in decision 702), then the FSM determines that the squelch circuit has detected a packet and control loops back to decision 701. However, if the FSM determines that the HSSQ signal has been asserted for more the TH1 threshold period of time, then a role reversal has occurred and control continues at 703 in which the FSM informs the other side's FSM (via control signal 659) of the role reversal. Both FSMs then assets their respective termination resistor network control signals to reconfigure the termination resistors on both ports for the FS mode and in accordance with which port is connected to the peripheral device and which port is connected to the host device.

It may be the case, however, that the squelch circuits are unable to detect a change in external resistance during a role change. For example, due to the permitted range of supply voltage and termination resistances, a particular combination of resistors and supply voltage may result in a DP voltage that is below the threshold capability of the squelch circuit to detect a logic high. Accordingly, method 700 utilizes additional logic to also detect a role reversal.

During normal operation, the bus should be idle for less than a certain period of time; else the devices will transition to a lower power mode (L1 or L2). To keep the bus "alive", the host periodically transmits SOF (Start-of-Frame) packets every 125 microseconds, for example. During a role reversal, however, no SOF packets are transmitted and the bus will be idle for more than a threshold period of time. However, other conditions may also cause the bus to be idle for an extended period of time (for more than 3 milliseconds) such as a high speed reset or a transition to the L2 state. The logic of steps 711, 712, 713, 714 and 715 differentiates these different conditions.

At 711, if a squelch circuit has not detected any bus activity for more than a TH2 threshold period of time (e.g., 2 ms), then the repeater determines, at 712, whether HS termination resistance (45-ohm pull-down resistors) is present on the bus. In one embodiment, the determination of step 712 includes the FSM switching off its HS termination resistors, disabling other HS analog circuits, and activating its respective current source 672 or 682 to cause current to flow into the DP and DM signal lines. If 45-ohm pull-down resistors (HS mode) are present on the bus, then the resulting voltage on the DP and DM signal lines will be the product of the fixed current level of the current source and the resistance of the HS termination pull-down resistors (45 ohms, but can be in a range of, for example, 40-50 ohms). The voltage determination circuit 670, 680 may be configured to produce an output signal 638, 648 indicative of whether the DP and DM bus voltages are consistent with the presence of HS pull-down resistor termination. In that case ('Y' branch at 712), the devices are determined to be engaged in a HS reset event (713), and the repeater remains in the HS mode. The peripheral device may initiate the same HS handshake following a POR or connect event.

However, if the answer is "no" (shown as "N" in FIG. 7) at 712, then it is still possible that an L2 state transition is occurring or a role reversal is occurring. Decision step 714 differentiates those two possibilities. If a role reversal has occurred, the voltage on the DP signal line will be greater than a threshold voltage TH3 (logic high) due to the 1.5-kohm pull-up resistor on the DP signal line for the peripheral device, as explained above. Determining whether the voltage on the DP signal line is greater than TH3 includes the FSM disabling the HS termination resistors and HS analog circuits, enabling its single-ended DP receiver (651, 661), and monitoring the output signal from the respective single-ended receiver 651 or 661 (FIGS. 5A and 5B). If the voltage on the DP signal line is greater than TH3, then a role reversal has occurred and steps 703 and 704 are performed as explained above. Otherwise, the devices are entering the L2 state in which, in one embodiment, the upstream portion of the repeater is the first to detect L2 entry at the 2 ms point, and that side portion's FSM informs the FSM on the downstream portion to remove its HS termination. Then, between approximately 3 ms and 3.125 ms (as per USB standard), the peripheral device removes its HS terminations and applies a 1.5 kohm pullup on DM. The downstream portion's FSM of the repeater detects that DP has become logic high, and will informs the upstream portion's FSM that it has entered L2.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

While some example embodiments suggest that certain elements are included in an integrated circuit while other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Modifications are possible in the described embodiments, and other embodiments are possible, within the scope of the claims.

What is claimed is:

1. A repeater comprising:
  a first port and a second port;
  one or more first pull-up resistors and one or more first pull-down resistors configured to be coupled to the first port;
  one or more second pull-up resistors and one or more second pull-down resistors configured to be coupled to the second port; and
  a first circuit configured to detect a voltage at the second port is above a first threshold, and a set of first pull-down resistors are coupled to the first port and a set of second pull-down resistors are coupled to the second port responsive to the detection of the voltage at the second port above the first threshold; and wherein
  the first circuit detects a voltage at the second port is above a second threshold, and the one or more first pull-up resistors are coupled to the first port and the one or more first pull-down resistors are decoupled from the first port responsive to the detection of the voltage at the second port above the second threshold.

2. The repeater of claim 1, wherein a set of second pull-down resistors are coupled to the second port and the one or more second pull-up resistors are decoupled from the second port responsive to the detection of the voltage at the second port above the second threshold.

3. The repeater of claim 1, wherein the first port is configured to be coupled to a first device and the second port is configured to be coupled to a second device.

4. The repeater of claim 3, wherein the repeater includes a state machine, and the state machine configured to determine that the first device and the second device are high-speed compliant, a set of first pull-down resistors are coupled to the first port and a set of second pull-down resistors are coupled to the second port responsive to the determination that the first device and the second device are high-speed compliant.

5. The repeater of claim 4, wherein when the state machine determines that at least one of the first device and the second device are not high-speed compliant, the one or more first pull-up resistors are coupled to the first port and a set of second pull-down resistors are coupled to the second port.

6. The repeater of claim 5, wherein a set of first pull-down resistors are decoupled from the first port and the one or more second pull-up resistors are decoupled from the second port.

7. The repeater of claim 1, in which the repeater is a universal serial bus (USB) repeater.

8. A repeater comprising:
a first port and a second port;
one or more first pull-up resistors and one or more first pull-down resistors configurable to be coupled to the first port;
one or more second pull-up resistors and one or more second pull-down resistors configurable to be coupled to the second port; and
a first circuit configured to detect a first condition when a set of first pull-down resistors coupled to the first port and a set of second pull-down resistors coupled to the second port, the first condition is in which a voltage at the first port is above a first voltage threshold for more than a first period of time; and wherein
responsive to detection of the first condition, the one or more first pull-up resistors coupled to the first port and a set of second pull-down resistors coupled to the second port.

9. The repeater of claim 8, wherein the one or more first pull-down resistors are decoupled from the first port and the one or more second pull-up resistors are decoupled from the second port.

10. The repeater of claim 8, wherein the first period of time is longer than a maximum length of time for a packet to pass through the repeater between the first and second ports.

11. The repeater of claim 8, wherein the first period of time is at least 40 microseconds.

12. The repeater of claim 8, in which the repeater is a universal serial bus (USB) repeater.

13. The repeater of claim 8, wherein the repeater includes a state machine, and the state machine configured to detect an idle state of the first port for more than a second threshold period of time.

14. The repeater of claim 13, wherein responsive to the detection of the idle state on the first port for more than the second threshold period of time, the first circuit configured to detect a second condition when a set of first pull-down resistors coupled to the first port and a set of second pull-down resistors coupled to the second port, the second condition is in which (a) one or more first pull-down resistors consistent with a high-speed compliant state not being coupled to the first port and, (b) a voltage on the first port being greater than a third threshold.

15. The repeater of claim 14, wherein responsive to detection of the second condition, the one or more first pull-up resistors coupled to the first port and a set of second pull-down resistors coupled to the second port.

16. A repeater comprising:
a first port and a second port;
one or more first pull-up resistors and one or more first pull-down resistors configurable to be coupled to the first port;
one or more second pull-up resistors and one or more second pull-down resistors configurable to be coupled to the second port;
a state machine configured to detect an idle state of the first port for more than a second threshold period of time; and
a first circuit, responsive to the detection of the idle state on the first port for more than the second threshold period of time, configured to detect a second condition when a set of first pull-down resistors coupled to the first port and a set of second pull-down resistors coupled to the second port, the second condition is in which (a) one or more first pull-down resistors consistent with a high-speed compliant state not being coupled to the first port and, (b) a voltage on the first port being greater than a third threshold;
and wherein responsive to detection of the second condition, the one or more first pull-up resistors coupled to the first port and a set of second pull-down resistors coupled to the second port.

17. The repeater of claim 16, wherein the one or more first pull-down resistors are decoupled from the first port and the one or more second pull-up resistors are decoupled from the second port.

18. The repeater of claim 16, wherein the first circuit configured to detect a first condition when a set of first pull-down resistors coupled to the first port and a set of second pull-down resistors coupled to the second port, the first condition is in which a voltage at the first port is above a first voltage threshold for more than a first period of time.

19. The repeater of claim 18, wherein responsive to detection of the first condition, the one or more first pull-up resistors coupled to the first port and a set of second pull-down resistors coupled to the second port.

20. The repeater of claim 18, wherein the first period of time is longer than a maximum length of time for a packet to pass through the repeater between the first and second ports.

* * * * *